Nov. 11, 1952   D. MARAGLIANO   2,617,829
PROCESS FOR THE PREPARATION OF VINYLIC ETHERS
Filed Feb. 28, 1948
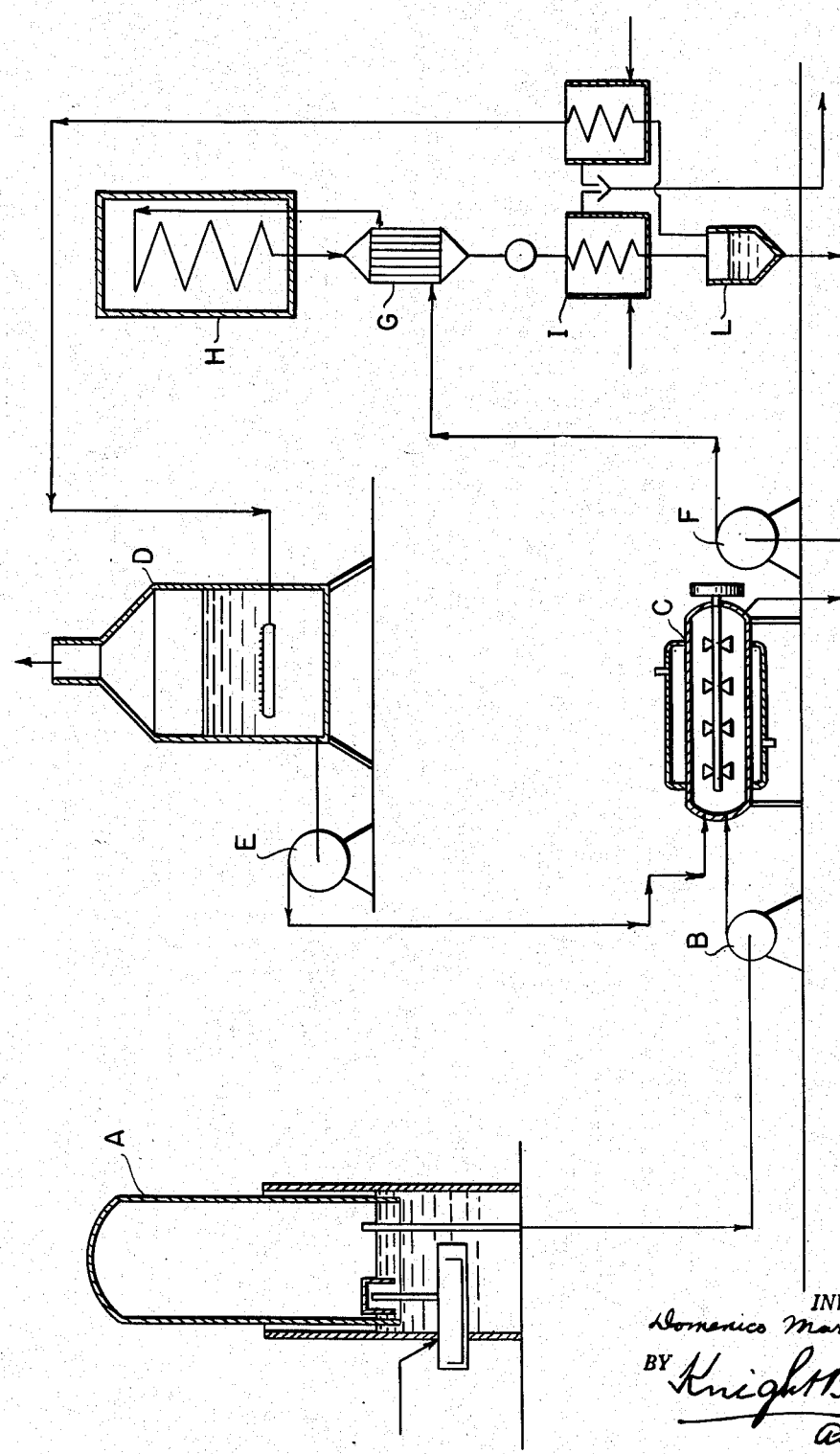
INVENTOR.
Domenico Maragliano
BY Knight Bros
Attys.

Patented Nov. 11, 1952

2,617,829

UNITED STATES PATENT OFFICE 2,617,829

PROCESS FOR THE PREPARATION OF VINYLIC ETHERS

Domenico Maragliano, Milan, Italy, assignor to Montecatini Società Generale per l'Industria Mineraria E Chimica Anonima, a corporation of Italy Application February 28, 1948, Serial No. 11,907
In Italy July 4, 1944

Section 1, Public Law 690, August 8, 1946
Patent expires July 4, 1964

2 Claims. (Cl. 260—614)

My invention relates to an improved process for the production of vinylic ethers by reaction of acetylene with an oxygenated organic compound such as alcohol.

It is well known that by adding acetylene to alcohols, at a temperature ranging from 80° C. to 300° C. and in presence of catalysts composed chiefly of alkalis, vinylic ethers are obtained.

This reaction can take place either in the gaseous or in the liquid phase.

When operating in gaseous phase, that is by forcing, for example, acetylene and alcohol vapours over an appropriate catalyst at given temperatures, vinylic ethers can be obtained. The principal drawback of this process is a low transformation yield, requiring very large catalyst chambers and recirculation of acetylene and of unreacted alcohol.

When operating in liquid phase, it is the usual practice to inject acetylene under pressure in alcohols at a temperature generally over 100° C. In order to avoid explosion danger, acetylene is diluted with inert gases, such as nitrogen, mostly in a 1:2 proportion, and fed into an autoclave containing the alcohol which is stirred until a given pressure, for example about 15 atmospheres is reached. The autoclave is then heated to the reaction temperature and the pressure rises to, for example, about 30 atmospheres. The decrease of pressure as the reaction sets in, is compensated by the addition of acetylene. In order to add acetylene, it is necessary to compress either the acetylene to a pressure above that of the autoclave, for example from 20 to 30 atmospheres or to cool the autoclave to relieve the pressure and start again from about 15 atmospheres. The continuous process consisting in the circulation in a ring packed tower of the acetylene-nitrogen mixture countercurrent to the oxygenated compound, has the drawback that it must be operated at rather low pressure and consequently with low yields. Another drawback is the necessity of discharging the spent gas with low acetylene content which carries with it vinylic and alcoholic compounds. For safety's sake the reaction vessel must be able to withstand a pressure notably higher than that of reaction, for example, at least eleven times higher than the partial pressure of the acetylene.

Now I have found that it is possible to conduct the reaction between the acetylene and the alcohol by a process which produces a high yield of vinylic ether products at a rapid rate with a relatively low production of unreacted primary constituents while avoiding the difficulties which heretofore have interfered with the efficient production of the desired end-product.

It is an object of my invention to provide an improved process including the steps of dissolving acetylene in an alcohol at a temperature between about −10° C. and +20° C. and under a pressure of from about 5 to 10 atmospheres; pumping the mixture into a reaction vessel, for example a simple coil in which the reaction may be conducted continuously rather than intermittently, the reaction between the acetylene and the alcohol thus taking place exclusively in the liquid phase; generally, at temperatures of from about 100 to 150° C.; and it is a further object of my invention to maintain in the reaction vessel a pressure (for instance 80 atm.) high enough to keep substantially all the acetylene dissolved in the reaction liquid under the said conditions.

The reaction products may be discharged continuously from the reaction vessel and the vinylic ethers are separated from the unreacted acetylene and alcohol which are returned to the process.

The advantages of the process of my present invention may be summarized as follows:

1. The process is continuous and with high transformation yields. The quantity of unreacted acetylene is negligible.

2. The rate of reaction is high owing to the circumstance that the two reagents are in the most favourable conditions, since the acetylene is dissolved in the alcohol and not in a distinct phase.

3. There is no necessity to dilute acetylene with inert gases and therefore no dragging of product takes place and there is no danger of explosion.

In the accompanying drawing there is illustrated, by way of example, a preferred embodiment of the operation of the process according to my invention, and the following is an example hereof, in which the process is carried out in a continuous way.

Example 500 litres of isobutylic alcohol and 8 kg. of potassium hydroxide as a catalyst are introduced into the saturator C having a volume capacity of 1000 litres. While cooling with water or brine, and under stirring, a flow of acetylene produced by the generator A and conveyed by the compressor B, is made to pass through it. During this absorption, the lowest temperature possible is maintained in order to facilitate dissolving, and a pressure of 10 atmospheres is maintained. The alcoholic acetylene solution is then injected by means of the pump F, through the heat exchanger G, into the catalysis-reaction vessel H, which may constitute a coil heated by external means, not shown, so that the temperature within it be kept at 150° C.; the products of reaction pass to the exchanger G where they yield their heat to preheat the solution entering at H; then through a valve placed after G, which valve is to be set to maintain within H a pressure of 50 atmospheres; and further through the refrigerator I, cooled with water, and the liquid-separator L, in which the ether and the non-reacted alcohol are collected, while the gas, after washing in alcohol in the washer D, is discharged to the atmosphere. The alcohol from the washer D, enriched with the ether entrained by the gas, is then passed to the saturator C. The step of washing is particularly advisable if alcohols having a low molecular weight are to be treated. The product collected in L is distilled to separate the ether from the alcohol, which latter is returned to the process.

Having now described my invention, what I claim is:

1. Method of preparing vinylic ethers from acetylene and alcohols, which comprises dissolving substantially all of the acetylene to be reacted in an alcohol at a temperature and a pressure at which the acetylene does not react with the alcohol, and subsequently and separately reacting the liquid solution thus obtained in the presence of a catalyst at a temperature of about 100° C. to 150° C. and sufficient pressure to maintain the exclusively liquid phase.

2. Method of preparing vinylic ethers from acetylene and alcohols, which comprises dissolving substantially all of the acetylene to be reacted, at a pressure of substantially 5 to 10 atmospheres and a temperature below 0° C. in an alcohol which is liquid at said temperature, and reacting in liquid phase and in presence of a catalyst the solution obtained in the previous step, at a temperature of about 100° C. to 150° C. while maintaining the reaction pressure sufficient to keep the acetylene dissolved in the alcohol.

DOMENICO MARAGLIANO.

REFERENCES CITED

The following references are of record in the file of this patent:

UNITED STATES PATENTS

| Number | Name | Date |
|---|---|---|
| 1,959,927 | Reppe | May 22, 1934 |
| 2,021,869 | Reppe | Nov. 19, 1935 |
| 2,191,053 | Walter | Feb. 20, 1940 |
| 2,406,674 | Evans | Aug. 27, 1946 |
| 2,472,084 | Beller | June 7, 1949 |

FOREIGN PATENTS

| Number | Country | Date |
|---|---|---|
| 423,942 | Italy | July 4, 1944 |